(12) United States Patent
Massard et al.

(10) Patent No.: US 9,229,221 B1
(45) Date of Patent: Jan. 5, 2016

(54) ELECTRODE CONFIGURATIONS FOR AN ELECTROWETTING DISPLAY DEVICE

(71) Applicant: Amazon Technologies, Inc., Reno, NV (US)

(72) Inventors: Romaric Mathieu Massard, Eindhoven (NL); Robin Leguijt, Eindhoven (NL); Nicolas Eugene Bergeron, Stein (NL); Henricus Petronella Maria Derckx, Weert (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/186,386

(22) Filed: Feb. 21, 2014

(51) Int. Cl.
    *G02B 26/00* (2006.01)
    *G02B 26/02* (2006.01)
    *G09G 3/34* (2006.01)
    *G02B 26/04* (2006.01)
    *G02B 26/08* (2006.01)

(52) U.S. Cl.
    CPC ............ *G02B 26/005* (2013.01); *G02B 26/004* (2013.01); *G09G 3/348* (2013.01); *B32B 2307/728* (2013.01); *B32B 2307/73* (2013.01); *G02B 26/04* (2013.01); *G02B 26/08* (2013.01); *G09G 3/3433* (2013.01); *G09G 2300/0426* (2013.01)

(58) Field of Classification Search
CPC .... G02B 26/00; G02B 26/005; G02B 26/002; G02B 26/004; G02B 26/04; G02B 26/08; G09G 3/34; G09G 3/3433; G09G 3/344; G09G 3/348; G09G 2300/04; G09G 2300/0421; G09G 2300/0426; G09G 2300/08; H01J 9/00; B32B 2307/728; B32B 2307/73
USPC ................. 359/228, 245, 253, 290–292, 295; 345/72, 211, 690; 445/24; 427/66, 256, 427/271, 558; 29/874
See application file for complete search history.

(56) References Cited

U.S. PATENT DOCUMENTS

| | | | | |
|---|---|---|---|---|
| 8,416,488 B2* | 4/2013 | Hayes et al. | ................... | 359/290 |
| 8,729,551 B2* | 5/2014 | Roh et al. | .......................... | 257/59 |
| 8,780,435 B2* | 7/2014 | Park et al. | ..................... | 359/290 |
| 8,854,718 B2* | 10/2014 | Jung et al. | ..................... | 359/290 |
| 8,885,243 B2* | 11/2014 | Kwon et al. | ................... | 359/290 |
| 2013/0208331 A1 | 8/2013 | Kim et al. | | |
| 2013/0278994 A1* | 10/2013 | Feil | ................................ | 359/296 |
| 2013/0301105 A1 | 11/2013 | Kim et al. | | |
| 2014/0029080 A1* | 1/2014 | Hwang | ......................... | 359/290 |

FOREIGN PATENT DOCUMENTS

WO    2013026877 A1    2/2013
WO    2013186279 A1    12/2013

* cited by examiner

*Primary Examiner* — Loha Ben
(74) *Attorney, Agent, or Firm* — BainwoodHuang

(57) ABSTRACT

An electrowetting display device has first and second fluids which are immiscible with each other and a first and a second support plate, a surface of the second support plate being located for being adjoined by the second fluid. An electrode which contacts the second fluid forms part of a protrusion and is separated from the surface of the second support plate.

22 Claims, 4 Drawing Sheets

ELECTRODE CONFIGURATIONS FOR AN ELECTROWETTING DISPLAY DEVICE

BACKGROUND

Electrowetting display devices are known. In an off state of a picture element of an example of such a device an oil layer covers a display area. In an on state the oil layer is retracted so as to cover less of the display area. To switch the picture element to the on state a voltage is applied via an electrically conductive fluid immiscible with the oil. To switch the picture element to the off state, the voltage is switched off.

It is desirable to provide improvements to an electrowetting element, for example to improve a contrast of a display effect.

DETAILED DESCRIPTION

Figure 1:
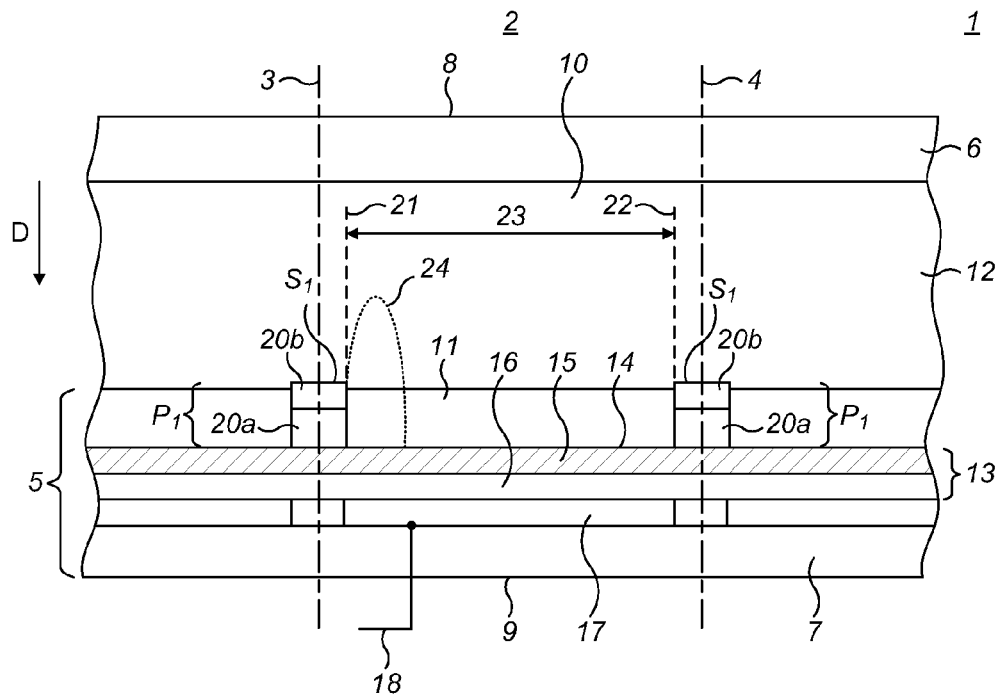
FIG. 1 shows schematically a cross section of an example picture element of an electrowetting display device.

FIG. 1 shows a diagrammatic cross-section of part of an electrowetting device in the form of an electrowetting display device 1. The display device includes an electrowetting element and in examples to be described a plurality of electrowetting elements, which are picture elements 2, one of which is shown centrally in the Figure with part of an adjacent electrowetting element shown either side. The lateral extent of the picture element is indicated in the Figure by two dashed lines 3, 4. The picture elements comprise a first support plate 5 and a second support plate 6. The support plates may be separate parts of each picture element, or the support plates may be shared in common by the plurality of picture elements. The support plates may include a glass or polymer substrate 6, 7 and may be rigid or flexible.

In examples described herein, a protrusion extends from the first support plate or from the second support plate. The protrusion may be formed as an integral part of the first support plate or the second support plate, or may be a separately formed element attached to the first support plate or the second support plate, or may be formed by extending, by for example building up, parts of the first and second support plates. In the present example, the protrusion extends from the first support plate, is labelled $P_1$ in FIG. 1 and forms the walls of the first support plate as described further below.

The display device has a viewing side 8 on which an image or display effect provided by one or more electrowetting elements of the display device can be viewed and a rear side 9. In the Figure a surface of the first support plate 5, which surface is in this example a surface of the substrate 7, defines the rear side 9; a surface of the second support plate 6, which surface is in this example a surface of the substrate 6, defines the viewing side; alternatively, in other examples, a surface of the first support plate may define the viewing side. The display device may be of the reflective, transmissive, transflective or transparent type. In examples, the second support plate is transmissive for light such that light having passed through at least one of the first and second fluids (described below) passes from a surface of the second support plate located to adjoin the second fluid, through the second support plate, to a further surface of the second support plate, which further surface defines the viewing side and is for example a surface of the substrate 6.

The display device may be of a segmented display type in which the image may be built up of segments, each segment including several picture elements. The display device may be an active matrix driven display type, a direct drive display type or a passively driven display device. The plurality of picture elements may be monochrome. For a color display device the picture elements may be divided in groups, each group having a different color; alternatively, an individual picture element may be able to show different colors.

A space 10 between the support plates is filled with a plurality of fluids. In this example the plurality of fluids includes two fluids: a first fluid 11 and a second fluid 12 at least one of which may be a liquid. The second fluid is immiscible with the first fluid. The second fluid is electrically conductive or polar and may be water or a salt solution such as a solution of potassium chloride in water. The second fluid may be considered an electrolyte. The second fluid may be transparent, but may be colored, white, absorbing or reflecting. The first fluid is electrically non-conductive and may for instance be an alkane like hexadecane or (silicone) oil.

The first fluid absorbs at least a part of the optical spectrum. The first fluid may be transmissive for a part of the optical spectrum, forming a color filter. For this purpose the first fluid may be colored by addition of pigment particles or a dye. Alternatively, the first fluid may be black, i.e. absorb substantially all parts of the optical spectrum, for example 90% or more of visible light incident on the first fluid, or reflecting. A reflective layer may reflect the entire visible spectrum, making the layer appear white, or part of it, making it have a color.

The support plate 5 includes an insulating layer 13. The insulating layer may be transparent or reflective. The insulating layer 13 may extend between walls of a picture element. However, to avoid short circuits between the second fluid 12 and electrodes arranged under the insulating layer, layers of the insulating layer may extend uninterrupted over a plurality of picture elements 2, as shown in the Figure. The insulating layer has a hydrophobic surface 14 facing the space 10 of the picture element 2; thus the hydrophobic surface defines an edge of the space 10. The thickness of the insulating layer may in examples be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 being located adjacent to the space 10, as shown in the Figure, such that the hydrophobic surface defines an edge of the space 10. The barrier layer 16 may have a thickness, taken in a direction perpendicular the plane of the substrate, of for example between 50 nanometers and 500 nanometers and may be made of an inorganic material like silicon oxide or silicon nitride or a stack of these (for example, silicon oxide-silicon nitride-silicon oxide) or an organic material like polyimide or parylene. The barrier layer may comprise multiple layers having different dielectric constants. The hydrophobic layer may be formed of an amorphous fluoropolymer layer such as AF1600 or AF1601 (available from DuPont, 1007 Market St., Wilmington, Del., USA), Hyflon AD® (available from Solvay, Solvay SA, rue de Ransbeek, 310-B-1120 Brussels, Belgium), Cytop (available from AGC Chemicals Europe, Ltd, PO Box 4, York House, Hillhouse International, Thornton Cleveleys, Lancashire FY5 4QD, United Kingdom) or any other low surface energy polymer, for example. It is further envisaged that non-polymer materials may be used to form the hydrophobic layer.

In an off state, no voltage is applied and the hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference between surface tension of the fluid and the surface energy of the solid at the fluid-solid boundary. For example, a high difference in surface tension and surface energy can indicate hydrophobic properties.

Each element 2 includes a first electrode 17 as part of the first support plate 5, i.e. the first electrode is located in the first support plate. The first electrode 17 is separated from the fluids by the insulating layer 13; electrodes of neighboring picture elements are separated by a non-conducting layer. In some examples, further layers may be arranged between the insulating layer 13 and the first electrode 17. The first electrode 17 can be of any desired shape or form. The first electrode 17 of a picture element is supplied with voltage signals by a signal line 18, schematically indicated in the Figure. A second signal line (not shown) is connected to a second electrode 20b that is in contact with the second fluid 12 which is conductive in this example. The second electrode is formed of an electrically conductive material, for example indium tin oxide (ITO) or another suitable metallic material, or an electrically conductive photoresist material such as SU8 including carbon, or polyaniline.

In some examples, the second electrode is formed of a black material, which for example is a material which absorbs substantially all wavelengths in the visible light spectrum, for example 90% or more of visible light on the material. The term substantially used here means that the black material absorbs sufficient light of different wavelengths to perform the required function. One example of such a function is to provide a black matrix structure in the display device, to improve contrast for a display effect. Providing a black second electrode in this way therefore provides the functionality of a black matrix combined with the functionality of the second electrode. This saves providing a black matrix with a separate part of the electrowetting element. An example of a suitable black material is SU8 including carbon.

As in this example, the second electrode may be a common electrode common to all elements, for example when they are fluidly interconnected by and share the second fluid, uninterrupted by walls, when the walls extend partly from the first support plate to the second support plate, i.e. the walls do not entirely extend from the first to the second support plate. In the example below with reference to FIG. 3, in which the walls extend from the first support plate to the second support plate, or in the example below of FIG. 4, when a protrusion extends from the second support plate and partly to the first support plate, the second electrode connected to the second signal line may also be common to all elements. The picture element 2 of FIG. 1 can be controlled by a voltage V applied between the first and second signal lines. The second electrode may be a ground, i.e. earth, electrode; for example an electric potential of zero volts may be applied to the second electrode; or in other embodiments a non-zero voltage may be applied to the second electrode. A non-zero electric potential may be applied to the first electrode for driving the element to a desired fluid configuration using the applied voltage V. The electrodes 17 on the substrate 7 are coupled to a display driving system. In a display device having the picture elements arranged in a matrix form, the electrodes can be coupled to a matrix of control lines on the substrate 7.

In the present example, the first fluid 11 is confined to one picture element by walls that follow the cross-section of the picture element. The cross-section of a picture element may have any shape; when the picture elements are arranged in a matrix form, the cross-section is usually square or rectangular. Although the walls are shown as structures protruding from the insulating layer 13, they may in other examples instead be a surface layer of the support plate that repels the first fluid, such as a hydrophilic or less hydrophobic layer. In further examples, for example which will be explained later with reference to FIG. 3, the walls may extend from the first to the second support plate, but in the present example may extend partly from the first support plate to the second support plate as shown in FIG. 1. The lateral extent of the picture element, indicated by the dashed lines 3 and 4, is defined by the center of the walls. The area between the walls of a picture element, indicated by the dashed lines 21 and 22, is called the display area 23, over which a display effect occurs. In the present example the walls are formed by the protrusion $P_1$ described above. Each wall at least partly confines the first fluid to the element, specifically to an area of the surface of the first support plate, which area is the display area, each wall being a wall formed along a side of the display area.

Figure 2:
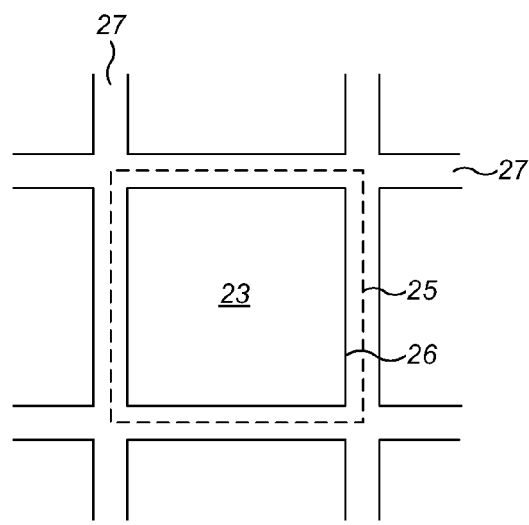
FIG. 2 shows schematically a plan view of a support plate of the display device.

FIG. 2 shows a matrix of square picture elements in a plan view of the hydrophobic layer of the first support plate. The lateral extent of the central picture element in FIG. 2, corresponding to the dashed lines 3 and 4 in FIG. 1, is indicated by the dashed line 25. Line 26 indicates the inner border of at least one wall; the line is also the edge of the display area 23. A pattern of the at least one wall covers a wall area 27 and in this example is shown as forming a grid.

In examples described herein, the first fluid adjoins a surface of the first support plate, this surface being in the present example the surface of the hydrophobic layer 15 which provides the display area 23. In this example, when no voltage is applied between the electrodes, i.e. when the element is in an off state, the first fluid 11 forms a layer between the walls, as shown in the FIG. 1. Application of a voltage will contract the first fluid, for example against a wall as shown by the dashed shape 24 in FIG. 1, thus changing the size of area the first fluid adjoins the display area. The controllable shape of the first fluid is used to operate the picture element as a light valve, providing a display effect over the display area 23. When applying a voltage to contract the first fluid, the second fluid adjoins the surface of the first support plate, in this example the display area 23, the size of area of second fluid adjoinment depending on the extent of first fluid contraction. Thus, when applying a voltage to contract the first fluid, the second fluid displaces part of the first fluid adjoining the surface and in doing so moves the first fluid to the contracted form.

In examples described herein, a second electrode forms part of the protrusion. The protrusion may comprise further parts, for example non-electrically conducting parts which together with the second electrode form a stack, such as a plurality of layers, forming the protrusion extending from the first support plate or in other examples the second support plate. In the present example, the second electrode 20b forms part of the walls together with a further part 20a of the protrusion, on which the second electrode 20b is formed. The further part 20a is in this example formed of an electrically insulating material, for example SU8, to prevent or minimize flow of electrical current between the first and second electrodes, via the protrusion. Thus, a dielectric property of the further part 20a may be used to ensure that an electric field from applying a voltage to change the fluid configuration is propagated between the second fluid and the first electrode rather than via the protrusion. The further part 20a may act as a spacer for the second electrode, for example by spacing the second electrode from a surface in the plane of the display area. The further part 20a may have a greater electrical insulating property than the first fluid or the second fluid, to increase the capacitance property of the protrusion. The capacitance property of the protrusion may be increased with increasing distance of the second electrode from the first electrode and the protrusion may be formed to position the second electrode 20b accordingly, for example by increasing the height of the further part 20a. In this way, the further part 20a acts as a spacer for the second electrode.

In examples described herein, at least one of the plurality of fluids, for example the second fluid, adjoins a surface of the second support plate. In other words, the surface of the second support plate is located for being adjoined by the second fluid. This surface of the second support plate is not configured as an electrode for contacting the second fluid. Thus, the surface of the second support plate may be formed of an electrically non-conductive material. Therefore, the second support plate may not in some examples include any electrical connections, electrically conductive material or electronic circuitry. In the present example, the surface of the second support plate is a surface of the substrate 6. With the surface of the second support plate not being configured as an electrode for contacting the second fluid and for example with the second support plate being absent of any electrical connections or electrically conductive material and/or for example that the configuration of the first fluid is switchable using a voltage applied independently of the surface of the second support plate, for example independently of any electrical connections or electrically conductive material associated with the second support plate, i.e. with the voltage being applied between the first and second electrodes, with the second electrode being separated from the surface of the second electrode, a contrast of a display effect provided by the element may be improved. Otherwise, the presence of any electrical connections or electrically conductive material in the second support plate, for example, would reflect light towards the viewing area and decrease a contrast of a display effect and the perception of a low intensity, for example black, display effect. This can happen if for example using an ITO electrode to form the surface of the second support plate, given the reflective properties of ITO. Further, with the surface of the second support plate not being configured as an electrode and/or the configuration of the first fluid being switchable using a voltage applied independently of the surface of the second support plate, manufacture of the second support plate may be simplified compared with known electrowetting elements; in some examples the second support plate may simply be a substrate for example made of glass and is therefore free from any manufacturing processes to incorporate electrical connections or electrodes.

Further, in examples described herein, there is a separation between the second electrode and the surface of the second support plate. In other words, the second electrode may not form part of the surface of the second support plate and the second electrode may not adjoin the surface of the second support plate. The separation may be defined along a directional axis D perpendicular to the surface of the second support plate. A surface of the second electrode which contacts the second fluid and the surface of the second support plate may be planar; the surface of the second electrode may lie in a plane which is different from and which has a separation from the plane of the surface of the second support plate. For example, the second electrode may be formed as a planar layer, with the surface of the second electrode being substantially parallel, i.e. for example parallel within manufacturing tolerances, to a planar further surface of the second electrode. In this example the planar layer is a patterned layer formed as a grid, i.e. the second electrode is grid shaped, having lateral dimensions similar to those of the wall area 27 shown in FIG. 2. The patterned layer being a grid may therefore have a plurality of openings for light to pass through, each opening being substantially aligned with the display area of a respective one electrowetting element of the plurality of elements over which the display effect is providable in dependence on a size of area that the first and second fluids of the respective one electrowetting element adjoin the display area. With such openings, light passing from the display area to the viewing side may not pass through the second electrode material, thus improving a quantity of light being transmitted to the viewing side and therefore a brightness of a display effect. Substantially aligned used here means that a lateral extent of an opening aligns with the lateral extent, i.e. the perimeter, of the display area of an electrowetting element, the alignment being taken in a direction perpendicular to the plane of the display area. Thus, an opening of an electrowetting element overlaps the display area of the respective electrowetting element. Plus, with the openings in the present examples, the extent of a surface of the second electrode is reduced compared with known systems with a second electrode having a larger surface extent. This reduction reduces any reflection of light by the second electrode material, through the second support plate and to the viewing side.

The separation may be a gap, which in the present example shown in FIG. 1 is a space between the second electrode of the wall and the second support plate, which space is occupied by second fluid shared via the space between two electrowetting elements. In such examples the wall is a wall of each of these two electrowetting elements. In other examples, such as those to be described later using FIGS. 3 and 4, the separation may be provided by a spacer for spacing the second electrode away from the surface of the second support plate in the direction D. The separation between the second electrode and the surface of the second support plate increases the distance of the second electrode from the viewing side compared with known systems which provide the second electrode on or as part of the surface of the second support plate. Thus, a contrast of a display effect may be improved further, with increasing distance of any reflective and electrically conductive material from the surface of the second support plate and therefore in the present example from the viewing side also.

Further, it has been found that forming the second electrode as part of the protrusion may not give any notable change in the switching behavior and response time for switching the configuration of the fluids using a voltage. This may be the case for a particular composition of second fluid. Motion of the fluids may be controlled for example by at least partly immersing the second electrode of a protrusion in the first fluid to reduce a thickness, in a direction perpendicular to the display area, of the first fluid, to define a location at which motion of the first fluid initiates when a voltage is applied.

Referring to the example of FIG. 1, the protrusion is formed such that the second electrode 20b is partly immersed by the first fluid when a zero voltage is applied, with the sides of the second electrode 20b, which form sides of the protrusion, contacting the second fluid at least when a zero voltage is applied. A surface $S_1$ of the second electrode contacts the second fluid and in this example faces away from the first electrode and may face towards the surface of the second support plate adjoined by the second fluid. Therefore, in examples, with the first support plate comprising the protrusion, the part of the protrusion formed by the second electrode is a part of the protrusion closest to the second support plate, the surface $S_1$ being separated from the surface of the second support plate by the separation. In other examples the surface $S_1$ may be orientated in a direction perpendicular to a plane of the display area, for example when forming a side of the protrusion. In known electrowetting elements, a surface of a common electrode contacting the second fluid faces towards the first electrode; however it has been realized in present examples this is not necessary, provided that the second electrode makes suitable electrical contact with the second fluid.

It is to be appreciated that forming the second electrode as part of the protrusion, for example the walls which extend partly from the first support plate to the second support plate, may limit any undesired flow of the first fluid from one electrowetting element to an adjacent element. This flow may be referred to as overflow, over the walls, caused by pressing of the first and second support plates of the manufactured element towards each other, which can reduce the volume of the space holding the fluids and push first fluid over the wall. If an appropriate electric potential is applied to the second electrode, this may reduce or prevent any such undesired overflow of the first fluid, by providing a surface of the second electrode, such as the surface $S_1$, which is sufficiently unfavorable for the first fluid to wet due to the applied electric potential; in other words the electrode surface wettability may be such that the second fluid wets the surface in preference over the first fluid. Another technique to reduce such undesired first fluid overflow is to coat a surface of the second electrode such as the surface $S_1$ with a material having an appropriate wettability which is unfavorable to wetting by the first fluid. Such a material may be a hydrophilic coating, but it is noted that in such examples the material needs to be applied in a pattern and/or with a thickness and/or of a chemical composition such that the second electrode is in sufficient electrical contact with the second fluid.

Figure 3:
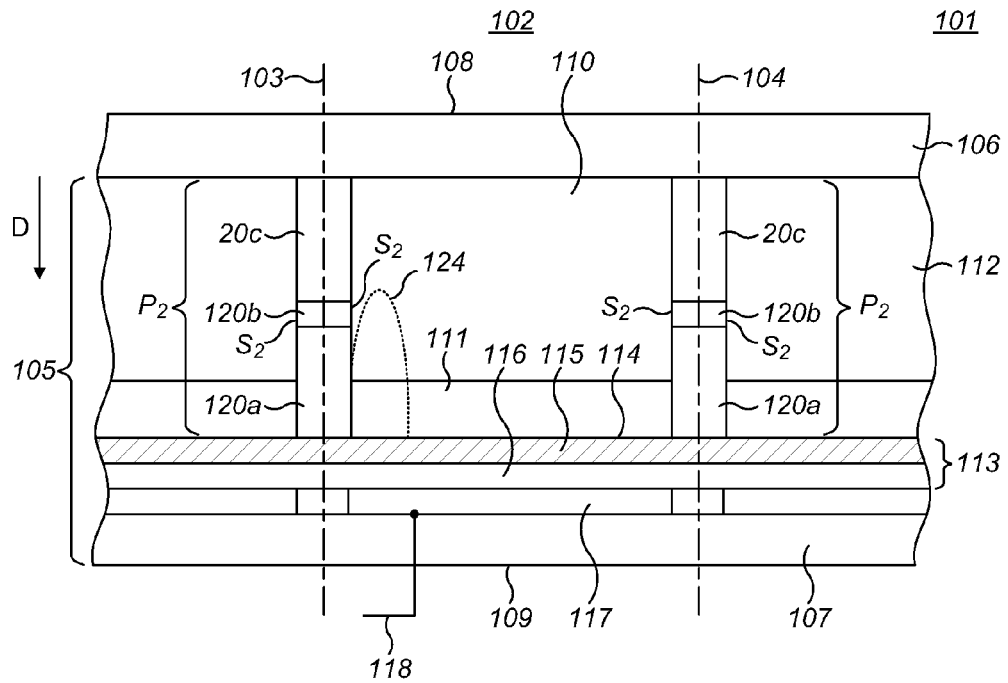
FIG. 3 shows schematically a cross section of a picture element according to a further example.

Another example will now be described with reference to FIG. 3. Features of this example are similar to those described previously in relation to FIGS. 1 and 2; the same reference numerals will be used for such features, incremented by 100; corresponding descriptions should be taken to apply.

In this example, a protrusion $P_2$ forms at least one wall of the electrowetting elements. The wall extends from the first support plate to the second support plate, thereby at least partly confining the second fluid within the lateral extent of the electrowetting element and in this example completely confining the second fluid within the lateral extent of the electrowetting element. In this example the wall is formed as a protrusion of the first support plate 105, but in other examples the wall may be formed as a protrusion of the second support plate 106 or as a combination of a protrusion of the first and second support plates. As illustrated in FIG. 3, the protrusion includes a stack of the second electrode 120*b*, a further part 120*a* and a second further part 120*c* which may be similar and/or the same in dimensions and material as the further part 120*a* and which acts as a spacer between the surface of the second support plate and the second electrode 120*b*. In this way, the second further part 120*c* in this example defines the separation of the second electrode from the surface of the second support plate contacting the second fluid. With the second electrode in this example being located between the further part 120*a* and the second further part 120*c*, a surface of the second electrode which faces towards and is closer than other second electrode surfaces to the second support plate is unavailable to contact the second fluid. However, in this example, a first surface $S_2$ of the second electrode forms a side of the wall of a first electrowetting element, which first surface lies in a plane perpendicular to the plane of the display area for example and which contacts the second fluid of the first electrowetting element. As the wall is the wall of both a first and a second electrowetting element which are adjacent to each other, a second surface $S_2$ of the second electrode forms a side of the wall of the second electrowetting element and contacts the second fluid of the second electrowetting element.

Another example will now be described with reference to FIG. 4. Features of this example are similar to those described previously in relation to FIGS. 1, 2 and 3; the same reference numerals will be used for such features, incremented by 200; corresponding descriptions should be taken to apply.

In this example, a protrusion $P_3$ extends from the second support plate into the second fluid but not into the first fluid. The second further part 220*c* defines the separation of the second electrode 220*b* from the surface of the second support plate and therefore acts as a spacer. The protrusion $P_3$ does not extend so far from the second support plate so as to meet the first support plate, for example to meet a wall for confining the first fluid, which wall may be formed by a protrusion from the first support plate similar to the further part 220*a* described previously. In other examples, the wall may instead of being a barrier to a fluid be a surface coating in a region between display areas of adjacent electrowetting elements, for example a hydrophilic surface coating, which confines the first fluid to the element. In this example the protrusion $P_3$ may function as a spacer to limit any movement of the first support plate and second support plate towards each other, for example if the first and second support plates are pressed together.

In this example a surface $S_3$ of the second electrode which faces the first support plate and which is in this example parallel to a plane of the display area and surfaces $S_3$ which form a side of the protrusion $P_3$ and which for example are perpendicular to the surface $S_3$ facing the first support plate, are in contact with the second fluid.

Figure 4:
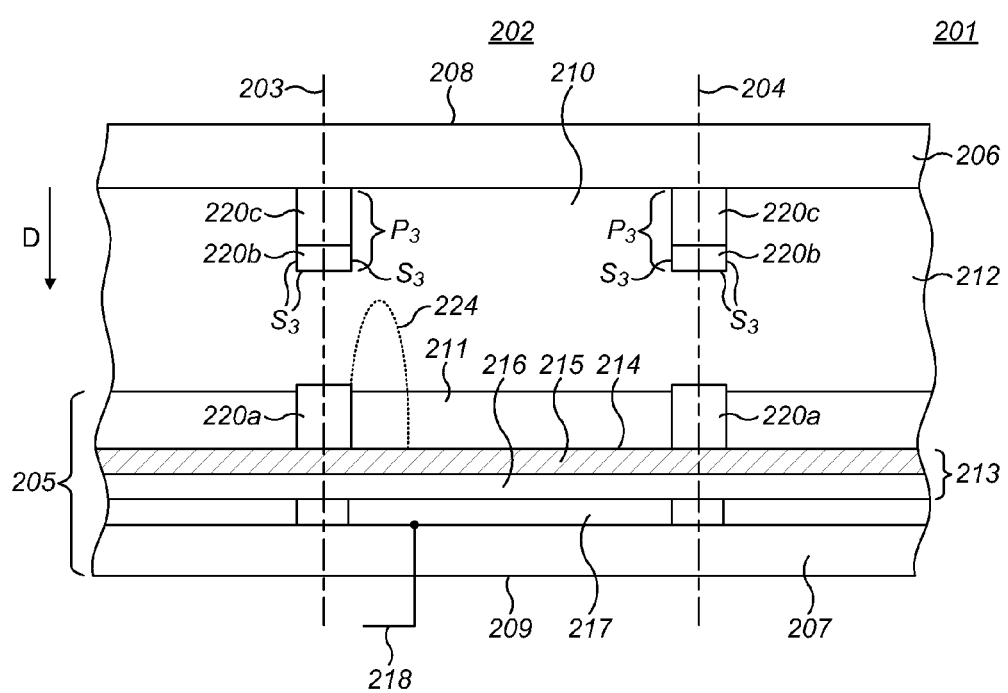
FIG. 4 shows schematically a cross section of a picture element according to another example.

FIG. 4 shows the protrusion $P_3$ aligned in the direction D with the wall formed by the further part 220*a*. In other examples the protrusion $P_3$ may instead or additionally be located in a region having a lateral extent substantially aligned, i.e. sufficiently aligned, with the perimeter of the display area. In such examples the protrusion $P_3$ may extend so as to be immersed partly in the first fluid or extend to be immersed in the second fluid but not the first fluid. In such examples, the protrusion $P_3$ may for example extend from the second support plate beyond the surface of the wall 220*a* of the first support plate, such that a planar surface of the second electrode is positioned in the same plane as or below the surface of the wall 220*a* illustrated in FIG. 4. A wettability property, such as a degree of hydrophilicity, of the protrusion $P_3$ may be configured such that sufficient electrical contact is obtained between the second fluid and the second electrode 220*b* and also such that the location and wetting by the first and second fluids of the protrusion $P_3$ may be used to define a location where motion of the first fluid initiates when a voltage is applied and/or to reduce a magnitude of voltage required to change a configuration of the fluids. In alternative examples, with the second electrode 220*b* extending such that part of the second electrode 220*b* is immersed in the first fluid 11 and such that sufficient of the second electrode 220*b* is in electrical contact with the second fluid 12 to apply the electric potential to the second fluid, a wettability property, such as a degree of hydrophobicity, of the protrusion $P_3$ may be configured such that sufficient electrical contact is obtained between the second fluid and the second electrode and such that a location and wetting by the first and second fluids of the protrusion $P_3$ may be used to define a location where the first fluid collects when a voltage is applied to change the configuration of the fluids. Thus, in such examples, the protrusion may be used to control fluid motion when a voltage is applied.

An example of a method of manufacturing a support plate for at least one electrowetting element will now be described. During the manufacturing process of the display device, the first support plate may be manufactured entirely, or may be provided during the manufacturing process as a partly or completely assembled support plate. When manufacturing the first support plate according to an example the substrate 7 is provided. An electrode layer comprising at least one electrode 17 is provided on the substrate 7. Subsequently, the insulating layer 13 in this example including the barrier layer 16 and the hydrophobic layer 15 is arranged on the electrode structure. Firstly, the barrier layer may be provided using Chemical Vapor Deposition (CVD) or Physical Vapor Deposition (PVD) for example sputter deposition or electron beam evaporation where temperature, pressure and power are controlled appropriately, as would be understood by the skilled person. The hydrophobic layer 15 may then be provided on the barrier layer, or in other examples on the electrode layer, for example by a wet coating process such as slit coating, flexoprinting, spin coating or dip coating as is well known in the art. The hydrophobic layer in the examples given here is a continuous uninterrupted layer of the first support plate common to all picture elements.

Figure 5:
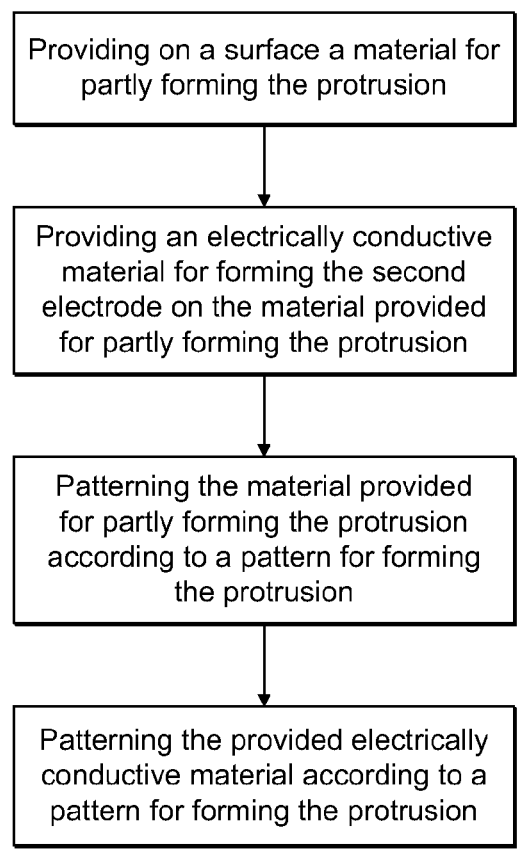
FIG. 5 shows a flow chart relating to a method of manufacturing a support plate.

With reference to FIG. 5, a protrusion according to the example of FIG. 1 may then be formed, by for example providing a material for partly forming the protrusion on a surface, for example on the surface of the hydrophobic layer. The material may be SU8 photoresist, for forming a spacer such as the further part 20*a* of the protrusion described previously using FIG. 1. An electrically conductive material for forming the second electrode may then be provided on the material provided for partly forming the protrusion. The electrically conductive material may be SU8 photoresist with carbon, which may be colored black for example, or another colored photoresist material, or ITO or another metallic compound. The material provided for partly forming the protrusion may be patterned according to a pattern for forming the protrusion. The provided electrically conductive material may also be patterned according to a pattern for forming the protrusion. The patterning of the material for partly forming the protrusion and the patterning of the electrically conductive material may be performed one after another, or together, for example simultaneously during the same patterning action.

The forming of the protrusion using this patterning may be performed using photolithography. For example, a grid-shaped mask may be used to pattern and form a grid shaped protrusion with a grid-shaped further part 20*a* and a grid-shaped second electrode. A photoresist patterning technique may for example be used, including pre-baking the materials once each has been provided, patterning the provided materials using photolithography and then developing the patterned material, i.e. the photoresist, using a suitable developer such as a solvent cyclopentanone or propylene glycol monomethyl ether acetate (PGMEA), tetramethylammonium hydroxide (TMAH) or an alkaline developer. This process is well known to the skilled person.

It is to be appreciated that such methods may be used to manufacture the first support plate described using FIG. 1. A similar method may be used, modified appropriately, to manufacture the first support plate or the second support plate described using FIGS. 3 and 4, respectively.

Once the first and second support plates are manufactured, one or more electrowetting elements may be assembled by attaching the first and second support plates together, for example using an adhesive seal at an outermost perimeter of an array of the one or more electrowetting elements, after having provided the first and second fluids in the space to be formed between the first and second support plates. The skilled person will readily appreciate suitable techniques for this.

The above examples are to be understood as illustrative examples. Further examples are envisaged.

For example, the second electrode may be connected to a source of an electric potential by the second signal line mentioned previously. The second signal line may for example connect to a display driving system or to earth. The second signal line may be connected to the second electrode at a lateral side of the display device. As the second electrode may be formed as a grid for example and is formed across a plurality of electrowetting elements, an electric potential of the second electrode may be applied to the second fluid evenly across a plurality of electrowetting elements. It is envisaged that other patterns of the second electrode may be used in other examples, provided that the second electrode provides a sufficiently even electric potential to the second fluid across the plurality of electrowetting elements.

In examples described above a lateral extent of a further part and, for certain examples, of a second further part, is shown as the same for each part and for the second electrode, to form a continuous wall surface. In further examples the lateral extent of any of these parts and of the second electrode may be different from another of these parts and/or from the second electrode. For example a lateral extent of the common electrode may be less than a lateral extent of a part of the protrusion underlying the common electrode. Indeed, any dimensions of the parts of the protrusions described above and of the second electrode may be adjusted in dependence on a particular construction of an electrowetting element. Further, different patterns and forms of the second electrode are envisaged in further examples. For example, referring to FIG. 4, the second electrode may be formed in a grid shape, but in other examples the second electrode may be formed in a different shape. Further, if the protrusion in FIG. 4 is to be located within the lateral extent of the display area, to act as a spacer which may reduce overflow described previously, the grid shaped form may not be suitable. However, in examples, it may be necessary that the second electrode still is formed across the plurality of electrowetting elements so that the electric potential can be applied to the whole second electrode structure and in an even manner to the second fluid in each electrowetting element, despite the second electrode in examples being connected at one point of the electrode structure to the electric potential source.

Figure 6:
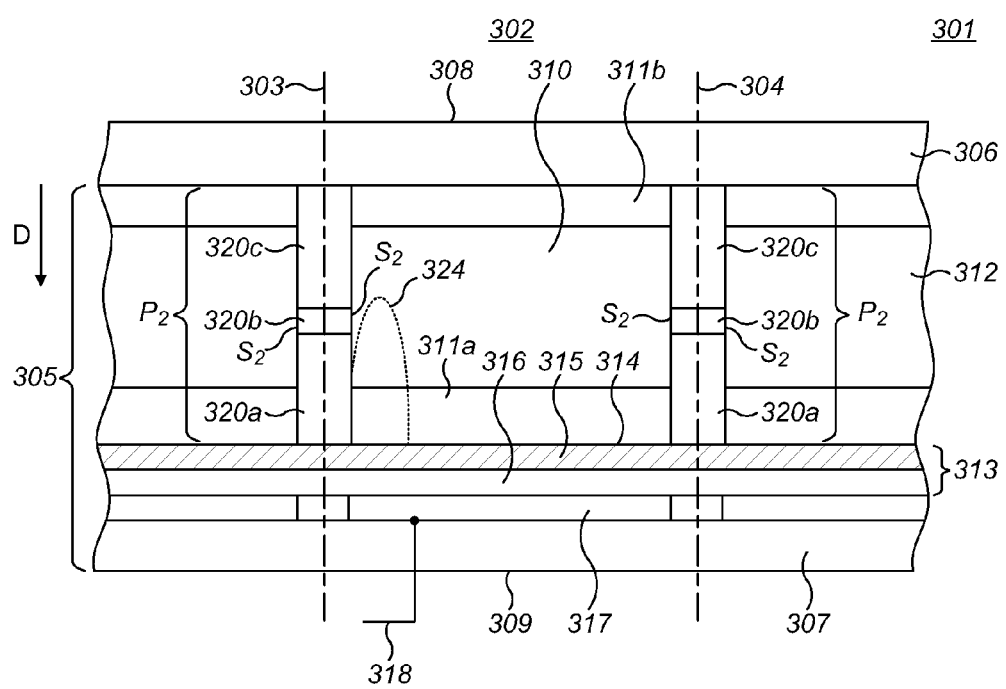
FIG. 6 shows schematically a cross section of a picture element according to another example.

Examples are described above with an element comprising a plurality of fluids including the first and second fluids. In further examples, such as the example of FIG. 6, it is envisaged that the provision of the second electrode in the protrusion as described in examples above may be used in an electrowetting element comprising two volumes of first fluid. Features of the example of FIG. 6 are similar to those described above with reference to FIG. 3; the same reference numerals will be used for such features, incremented by 200; corresponding descriptions should be taken to apply. This example may be referred to as a "two layer" electrowetting element, with one layer of first fluid 311*a* at least partly adjoining the display area of the first support plate 305 and a second layer of first fluid 311b at least partly adjoining the surface of the second support plate 306. The element therefore comprises a plurality of fluids including a first fluid and a second fluid similar to those described previously and a third fluid which may be similar in composition to the first fluid and which forms the second layer of first fluid described herein. The second fluid 312 may adjoin part of the display area of the first support plate 305 and/or part of the surface of the second support plate 306, depending on an applied voltage. In such examples the second support plate would be different from examples described above, as it would require electronics for switching a configuration of the second layer of first fluid. However, by providing the second electrode in the protrusion, the second electrode position may not hinder the switching performance of the two layers of first fluid, particularly of the second layer at the second support plate, giving improved performance for such a "two layer" system.

It is to be understood that any feature described in relation to any one embodiment may be used alone, or in combination with other features described and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting display device comprising an electrowetting element comprising:
    a first fluid and a second fluid immiscible with the first fluid;
    a first support plate and a second support plate, a surface of the second support plate being located for being adjoined by the second fluid;
    a first electrode located in the first support plate;
    a protrusion; and
    a second electrode in contact with the second fluid,
    wherein the second electrode forms part of the protrusion, and there is a separation between the second electrode and the surface of the second support plate.

2. An electrowetting display device according to claim 1, the first support plate comprising the protrusion, the part of the protrusion formed by the second electrode being a part of the protrusion closest to the second support plate, wherein a surface of the second electrode which contacts the second fluid is separated from the surface of the second support plate by the separation.

3. An electrowetting display device according to claim 1, the surface of the second support plate being planar, wherein a surface of the second electrode which contacts the second fluid is planar and lies in a plane different from and with a separation from a plane of the surface of the second support plate.

4. An electrowetting display device according to claim 3, wherein the second electrode is formed as a planar layer, the plane of the surface of the second electrode being substantially parallel to a plane of a planar further surface of the second electrode.

5. An electrowetting display device according to claim 1, wherein the second electrode is patterned with at least one opening for light to pass through.

6. An electrowetting display device according to claim 1, wherein the second support plate is transmissive for light such that light having passed through at least one of the first and second fluids passes from the surface of the second support plate, through the second support plate, to a further surface of the second support plate which corresponds with a viewing side of the electrowetting element for viewing a display effect provided by the electrowetting element.

7. An electrowetting display device according to claim 1, wherein the protrusion forms a wall for at least partly confining the first fluid to an area of a surface of the first support plate adjoined by the first fluid.

8. An electrowetting display device according to claim 7, wherein the first support plate comprises the wall, which wall extends from the first support plate and determines a space between the wall and the second support plate, the space being occupied by part of the second fluid, a surface of the second electrode contacting second fluid in the space.

9. An electrowetting display device according to claim 8, including a plurality of the electrowetting element including a first electrowetting element and a second electrowetting element, wherein the wall of the first electrowetting element is the wall of the second electrowetting element, the second fluid being shared between the first and second electrowetting elements via the space.

10. An electrowetting display device according to claim 7, wherein the wall extends from the first support plate to the second support plate, thereby at least partly confining the second fluid within a lateral extent of the electrowetting element, a surface of the second electrode forming a side of the wall and contacting the second fluid.

11. An electrowetting display device according to claim 10, including a plurality of the electrowetting element including a first electrowetting element and a second electrowetting element, wherein the wall of the first electrowetting element is the wall of the second electrowetting element, a first surface of the second electrode contacting the second fluid of the first electrowetting element and a second surface of the second electrode contacting the second fluid of the second electrowetting element.

12. An electrowetting display device according to claim 1, wherein the separation is determined by at least one spacer such that the protrusion extends from the second support plate into the second fluid but not into the first fluid.

13. An electrowetting display device according to claim 1, wherein the second electrode is formed of a material for absorbing 90% or more of visible light incident on the material.

14. An electrowetting display device according to claim 1, comprising a plurality of the electrowetting element, wherein the second electrode is a patterned layer having a plurality of openings for light to pass through, each of the plurality of openings being substantially aligned with a display area of a respective one of the plurality of the electrowetting element over which a display effect is providable in dependence on a size of area that the first and second fluids of the respective one of the plurality of the electrowetting element adjoin the display area.

15. An electrowetting display device according to claim 1, wherein the surface of the second support plate is formed of an electrically non-conductive material.

16. An electrowetting display device according to claim 1, wherein a configuration of the first fluid is switchable using a voltage applied between the first electrode and the second electrode separated from the surface of the second support plate by the separation.

17. An electrowetting display device according to claim 1, including a third fluid immiscible with the second fluid, wherein the first fluid adjoins a surface of the first support plate and the third fluid adjoins the surface of the second support plate.

18. A method of manufacturing a support plate for an electrowetting display device including at least one electrowetting element including:
- a first fluid and a second fluid immiscible with the first fluid;
- a first support plate and a second support plate, a surface of the second support plate being located for being adjoined by the second fluid;
- a first electrode located in the first support plate;
- a protrusion; and
- a second electrode in contact with the second fluid, wherein the second electrode forms part of the protrusion, and there is a separation between the second electrode and the surface of the second support plate, the method comprising:
- a) providing on a surface a material for partly forming the protrusion;
- b) providing an electrically conductive material for forming the second electrode on the material provided for partly forming the protrusion;
- c) patterning the material provided for partly forming the protrusion according to a pattern for forming the protrusion; and
- d) patterning the provided electrically conductive material according to a pattern for forming the protrusion.

19. A method according to claim 18, including performing the patterning in c) and d) together.

20. A method according to claim 18, wherein the materials provided in a) and b) are photoresist materials and the patterning in c) and d) is performed using photolithography.

21. A method according to claim 18, wherein the surface of the second support plate is formed of an electrically non-conductive material.

22. A method according to claim 21, wherein a configuration of the first fluid is switchable using a voltage applied between the first electrode and the second electrode separated from the surface of the second support plate by the separation.

* * * * *